(12) United States Patent
Yahaba et al.

(10) Patent No.: US 7,022,939 B2
(45) Date of Patent: Apr. 4, 2006

(54) THROUGH WELD FOR ALUMINUM OR ALUMINUM ALLOY BASE METALS BY USING HIGH-DENSITY ENERGY BEAMS

(75) Inventors: Takanori Yahaba, Saitama (JP); Masato Takikawa, Saitama (JP); Hirobumi Sonoda, Chiba (JP); Junichi Ibukuro, Chiba (JP); Kenji Okuyama, Chiba (JP); Toshiyasu Ukena, Tokyo (JP); Yasutomo Ichiyama, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 106 days.

(21) Appl. No.: 10/679,283

(22) Filed: Oct. 7, 2003

(65) Prior Publication Data

US 2004/0084425 A1    May 6, 2004

(30) Foreign Application Priority Data

Oct. 31, 2002   (JP) .............................. 2002-317183

(51) Int. Cl.
*B23K 26/00*   (2006.01)
(52) U.S. Cl. ........................ 219/121.64; 219/121.85; 219/121.84
(58) Field of Classification Search ........... 219/121.64, 219/121.63, 121.85, 121.86, 121.65, 121.66, 219/121.84
See application file for complete search history.

(56) References Cited

U.S. PATENT DOCUMENTS

| | | | | |
|---|---|---|---|---|
| 4,000,392 A | * | 12/1976 | Banas et al. | 219/121.63 |
| 5,296,676 A | * | 3/1994 | Gilman | 219/137 WM |
| 5,388,753 A | * | 2/1995 | Bjorkman, Jr. | 228/42 |
| 5,784,970 A | * | 7/1998 | Fehr et al. | 105/401 |
| 6,848,233 B1 | * | 2/2005 | Haszler et al. | 52/783.17 |
| 2004/0200813 A1 | * | 10/2004 | Alips et al. | 219/121.63 |

FOREIGN PATENT DOCUMENTS

JP          05-228663           9/1993

* cited by examiner

Primary Examiner—M. Alexandra Elve
(74) Attorney, Agent, or Firm—Arent Fox, PLLC.

(57) ABSTRACT

This invention provides a new through weld method to carry out welding of a base metal made of aluminum or that of aluminum alloy using high energy beams wherein a shield gas ambience (an inert gas ambience) to cover a welding site in a submerged-scar is formed, even a shield gas ambience (an inert gas ambience) to cover a welding site irradiated by the high energy beams. Since the former shield gas ambience to cover the submerged-scar pushes the keyhole against the gravity and/or the gas pressure force of the latter shield gas supplied to the laser irradiation side, then the forming of hang down of beads and the resultant projection of the welding base metal are prevented.

8 Claims, 8 Drawing Sheets

The First Embodiment

The First Embodiment

The Second Embodiment

FIG.5

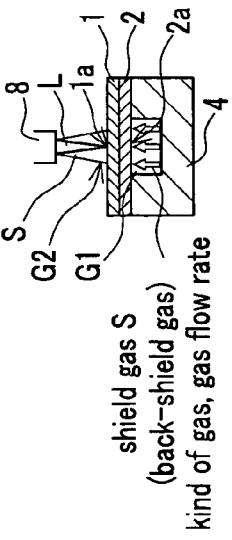

| back-shield gas flow rate (l/min) | Effect of back-shield gas | | | compressed air |
|---|---|---|---|---|
| | Ar | N2 | He | |
| 10 | height of submerged-scar 1.4mm | height of submerged-scar 1.5mm | height of submerged-scar 1.8mm | height of submerged-scar 3.4mm |
| 25 | height of submerged-scar 1.6mm | height of submerged-scar 1.2mm | height of submerged-scar 1.2mm | height of submerged-scar 2.9mm |
| 40 | height of submerged-scar 1.1mm | height of submerged-scar 1.1mm | height of submerged-scar 1.0mm | height of submerged-scar 2.3mm |

- Possible to remarkably reduce height of submerged-scar and occurrence of projection when Ar, N2 or He is used for the shield gas
- Impossible to suppress the occurrence of projection even though reduce height of submerged-scar when compressed air is used

FIG.6

| nozzle gap (mm) | outlook of submerged-scar | sectional macrograph |
|---|---|---|
| 3 | height of submerged-scar: 1.3mm | |
| 6 | height of submerged-scar: 1.9mm | |
| 10 | height of submerged-scar: 1.4mm | |
| 15 | height of submerged-scar: 2.2mm | |
| 20 | height of submerged-scar: 1.9mm | |

Al welding base metal, YAG laser welding

SP welding base metal, YAG laser welding

⟨cause of occurence of projections⟩

Al welding base metal, MIG welding

THROUGH WELD FOR ALUMINUM OR ALUMINUM ALLOY BASE METALS BY USING HIGH-DENSITY ENERGY BEAMS

FIELD OF THE INVENTION

This invention relates to a through weld method applied to a base metal made of aluminum or that of aluminum alloys by using high-density energy beams, especially to the weld method that prevents a hang down of beads made of the melted base metal in welding operation.

BACKGROUND OF THE INVENTION

The through weld by using high-density energy beams, such as a laser beam, an electron beam et al., generates little thermal deformation and less segregation of the fused metal due to quick cooling for solidification at the welding sites, therefore it has been used for the stack welding and butt welding of steel materials especially thin steel sheets.

FIG. 8A shows a cross sectional view of the conventional welded joint of aluminum and aluminum alloy base metals. FIG. 8B shows a cross sectional view of the welding site of the conventional through weld of rolling steel plate (called as "SP", hereinafter). FIG. 8C shows a cross section view of the through weld of an aluminum base metal by using MIG (Metal Inert Gas) weld method as given as the reference.

As shown in FIG. 8A and FIG. 8B, when through weld is carried out for an aluminum metal base and an SP metal base, a key hole (a molten pool or a keyhole-shaped fusion trace) is formed. Since the solidification speed of SP is slower than that of the aluminum and the viscosity of the melted SP is larger than that of aluminum, the hang down of beads is not made and the surface of a submerged-scar c2 becomes smooth and has no projections. As shown in FIG. 8C, for the case of the through weld of aluminum base metal by using MIG weld method, the molten pool d made by arc A becomes thermally conductive and no hang down of beads is made even though the viscosity of melted aluminum base metal is low and then the submerged-scar 3 has a smooth bead surface.

However, for the through weld of aluminum base metal by using a laser beam a, a hang down of beads is easily made when a thermal heat input per unit time is large. This results into forming of a needle-like projection formed at the submerged-scar.

It can be assumed that the shield gas h blown to the welding site g from a torch, wherein the shield gas can prevent the generation of blow holes and the oxidation of melted base metals, pushes the keyhole down to the side of the submerged-scar and assists the hang down of the beads. Therefore it is expected the growth of the needle-like projection e is resulted from these phenomenological factors as pushing the keyhole, low viscosity of the melted base metal, the solidification speed of the projection e in accordance with the high-speed welding.

For this phenomenological process, when a projection e is formed at the side of the submerged-scar c1, an under-fill is generated at the laser irradiated side and the mechanical strength of the welded joint remarkably decreases. Therefore, it is quite necessary to refill the filler at the site of under-fill and remove the projection e.

It may be possible to suppress the generation of submerged-scar by decreasing the thermal heat input in the conventional through weld of aluminum base metal by using a laser beam a. However, in this method, the problem that the laser beam tends to be reflected and the continuous welding may cease in sites may happen.

The forming of projection e can be prevented when a thick welding base metal is used at the side of the submerged-scar and the minimum spot size of the laser beam is set to locate far from the side of the submerged-scar to be. However it is necessary to select thick welded base metals for this method, therefore it is a problem that the range of application of this method is limited Taking two intuitive properties; that no projections are formed for the through weld by means of MIG weld or through weld of an SP base metal by means of high-density energy beam and that the hang down of beads is generated and the projection is formed at the site of the merged-scar when the thermal heat input is increased for the through weld of aluminum base metals by using a laser beam a., it can be expected that the hang down of beads and the resultant projection forming can be prevented if the molten pool can be pushed from the side or the submerged-scar to the laser irradiated side.

An invention related to this technology that a backing plate is used for the back side of welding base metal in order to prevent the hang down of the beads and the forming of the projection for aluminum through weld by using laser has been proposed.

Reference 1

JP-A-05-228663

However, even the hang down of beads and the forming of the projection can be prevented by using the backing plate as described in this invention, it may happen that the backing plate and the welding base metal are fused to join each other. For this case, it is necessary to rework for the post process as stripping off the projections and surface polishing of the welding sites and there is a problem of additional time-consuming works.

This invention has been proposed for solving the above problem and is subject to the preventing the forming of projections by pushing the molten pool in an inert gas ambience for aluminum through weld using a laser beam.

SUMMARY OF INVENTION

In order to solve the above problem, this invention provides a new through weld method to carry out the weld of a base metal made of aluminum or that of aluminum alloy wherein a shield gas ambience that covers the surface of the submerged-scar is formed at the side of the submerged-scar.

When the site to be a submerged-scar is shielded off from the air by immersing in the shield gas ambience, the oxidation of the beads and the generation of blow hole due to the oxygen and hydrogen contained in the air is suppressed. In this welding process, the shield gas ambience (inert gas ambience) cools the submerged-scar and the adjacent site and pushes up the keyhole against the pressure of the shield off gas blown onto the laser irradiated side. Therefore, the forming of the hang down of the beads and the resultant under-fill is prevented and it is concluded that no projection is formed at the site to be a submerged-scar and that the back surface is kept smooth without any projection.

BRIEF DESCRIPTION OF THE DRAWINGS

FIG. 5 shows the plan views (upper schematics in the fields of columns) and the side views (lower schematics in the fields of columns) of welded joints regarding to the through weld described in the first embodiment for a case that a gas flow rate of a shield gas supplied onto a laser irradiation side is kept constant and a shield gas supplied onto a submerged-scar side is varied.

FIG. 6 shows a cross sectional view of a welded joint regarding to a through weld described in the second embodiment for a case when a blowing direction of a shield gas is changed in accordance with a direction of a nozzle against a submerged-scar.

DETAILED DESCRIPTION OF THE INVENTION

Two embodiments regarding to the present invention will be explained using FIG. 1 and FIG. 2, especially the effects of the present invention will be described in details.

The First Embodiment

Figure 1A:
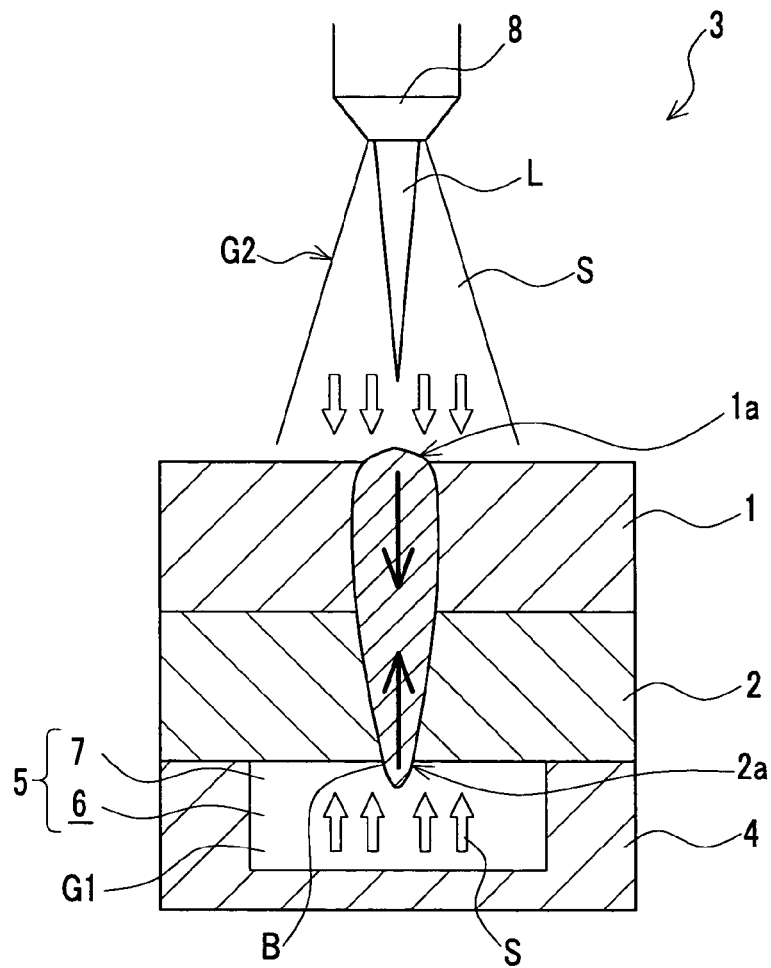
FIG. 1A and FIG. 1B conceptually show cross sectional front and side views of the first embodiment of the through weld regarding the present invention, respectively.
Figure 1B:
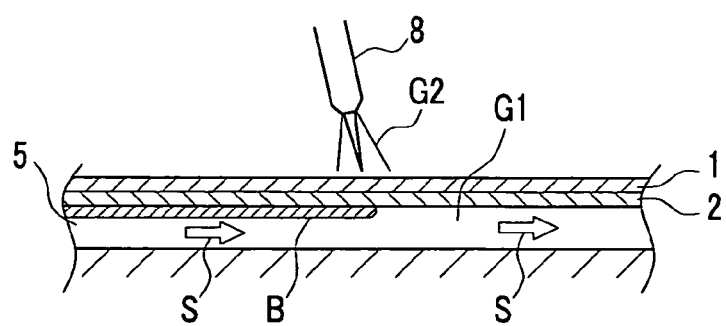

FIG. 1A and FIG. 1B show the cross sectional views of the first embodiment of the through weld regarding the present invention. FIG. 1A shows the cross sectional view of the surface normal to the weld line and FIG. 1B shows the cross sectional view of the surface parallel to the weld line. The welding base metals 1 and 2 are fixed onto a mounting stage 4 (not shown in the figures) of a welding machine 3.

The mounting stage 4 is equipped with a shield gas supply 5 that provides a shield gas ambience (an inert gas ambience) G1 that covers the site 2a of the submerged-scar B on a welding base metal 2. A shield gas supply 5 is constructed with a chamber 6 formed in the mounting stage 4 and an open hole that opens at the upper side of the mounting stage 4 and opens to the outside through the open hole portion 7. The open hole portion is formed along the site 2a of the submerged-scar B and leads the shield gas S supplied to the chamber 6 so that the shield gas S blows upper side and forms to cover the site 2a of the submerged-scar B. The width of the open hole 7 is wider than that of the site 2a of the submerged-scar B.

A torch 8 from which the laser beam L is emitted is set to be controlled in X, Y and Z axes against a laser welding machine 3. A chamber 6 and the torch 8 are connected to a shield gas supply source (not shown in the figures) through a shield gas supply path (not shown in the figures) to supply the shield gas S. Therefore, the shield gas S blown out from the torch 8 forms a shield gas ambience (an inert gas ambience) G2 that covers the surface of the welding site la of the upper welding base metal 1 and the shield gas S blown from the open hole 7 forms a shield gas ambience (an inert gas ambience) G2 that covers the surface of the welding site 2a of the submerged-scar B of the lower welding base metal 2. Since the shield gas ambiences G1 and G2 shield off the welding base metal 1a and the site 2a of the submerged-scar B, respectively, from oxygen and hydrogen contained in the open air, forming of the blow holes and surface oxidation of the beads due to the reaction with the hydrogen and oxygen included the open air can be prevented.

When the laser beam L is irradiated to the welding site la as forming the shield gas ambiences G1 and G2 by supplying the shield gas S, a keyhole is formed in the normal direction of the superpositioned surface of the two welding base metals 1 and 2 to be stack welded and the welding site 1a is melted by the thermal conduction from the wall of the keyhole.

Once the melt down of the welding site 1a reaches to the site 2a of the submerged-scar B, the shield gas (back-shield gas) S supplied in the back side cools down the melted metal to the solid metal as well as pushes up the keyhole. Consequently, the forming of the projection at the submerged-scar is prevented and the height of the extrusion at the submerged-scar becomes constant. Since the under-fill is suppressed in accordance with preventing a hang down of beads, it is possible to reduce to refill the filler to welding site 1a.

Figure 8A:
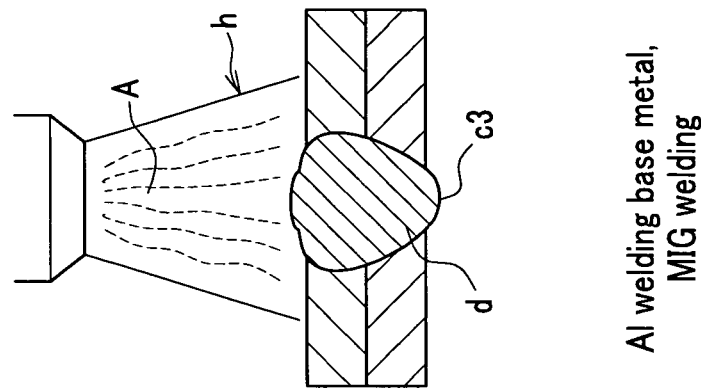
FIG. 8A, FIG. 8B and FIG. 8C show cross sectional views of welded joints using the conventional through weld.
Figure 8B:
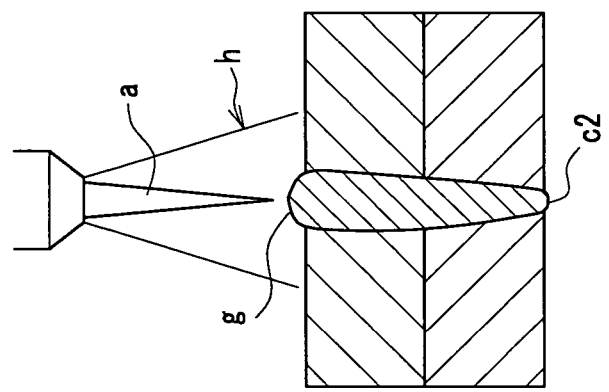
Figure 8C:
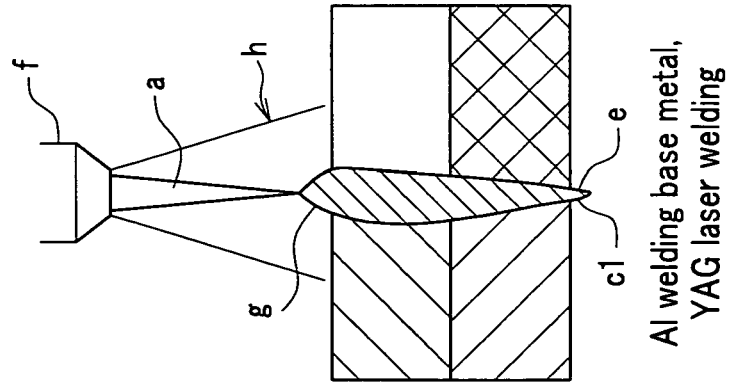

According to the first embodiment, it is possible to solve the problem seen in the conventional welding technology, that is, the projection made of beads (the projection at the submerged-scar B (shown as "projection c1" in FIG. 8A)) tends to be formed due to the material properties of aluminum (as low viscosity in the melted state, easily to hump due to the inclusion of a low boiling point component (such as Mg)) and the properties of laser welding (high-speed solidification and forming of a particular shape of keyholes).

In addition, the suppressing technology against submerged-scars as explained in this embodiment can widely be applied to through weld, especially it is an appropriate welding technology to be used for the doors and the open sites of tail gates, the middle portions of the floor of cars as examples. As a further example, the welding site of the floor makes the submerged-scars inside of the floor construction if closed surface welding can, for example, alternate the floor welding, then the present embodiment as the suppressing technology against submerged-scars is not specifically required.

The Second Embodiment

Figure 2A:
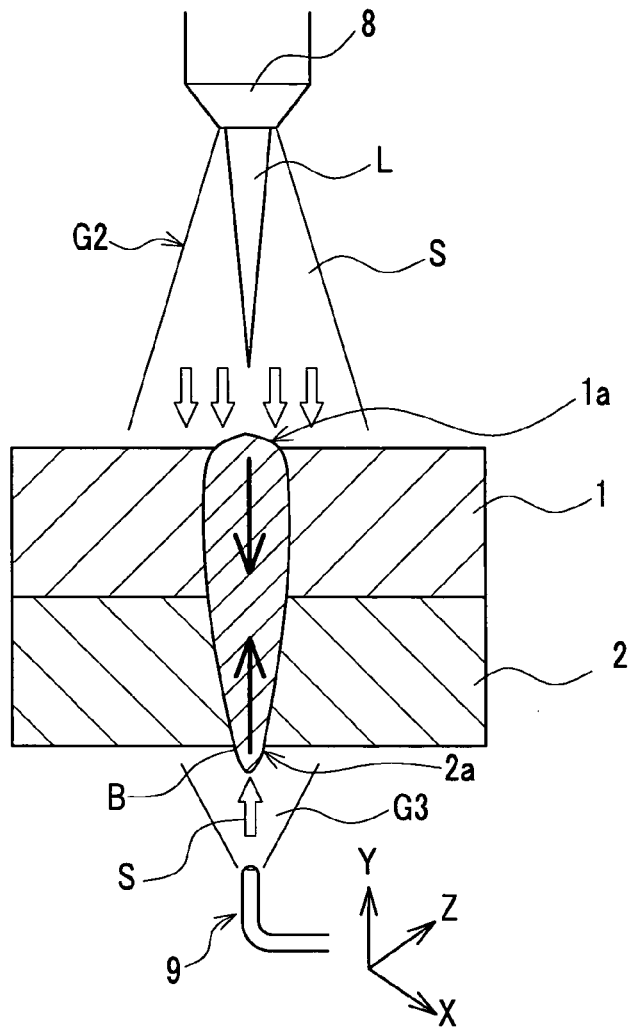
FIG. 2A and FIG. 2B show cross sectional front and side views of the second embodiment of the through weld regarding the present invention, respectively.
Figure 2B:
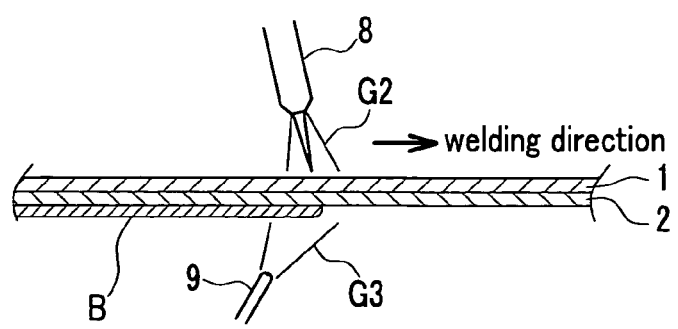

FIG. 2A and FIG. 2B show cross sectional views of the second embodiment of the through weld regarding the present invention; FIG. 2A shows the front view and FIG. 2B the side view. The shield gas supply consists of a nozzle 9 to blow out shield gas S, a shield gas supply source (not shown in the figures) such as gas cylinders etc. to supply the shield gas S through a shield gas supply path, a manipulator (a moving means) into which the nozzle 9 is installed so and which moves the nozzle 9 in X, Y and Z axes. One of the welding base metals 1 and 2 supperpositioned is mounted onto a fixing stand in a fashion of cantilever. The nozzle 9 is installed in an upper direction as the blowing outlet faces to the site 2a of the submerged-scar B. In addition, the nozzle 9 is connected to a shield gas supply source as a gas cylinder etc. to supply the shield gas S through a shield gas supply path.

The previous manipulator is controlled by a robotic controller to which the control movement has been carried out as "teaching", that is, been taught beforehand so that the nozzle 9 moves along the site 2a of the submerged-scar B, that the nozzle 9 moves in the orbit that is apart from the site 2a of the submerged-scar B in a predetermined distance and that the starting (starting point of the movement) and the ending (ending point of the movement) of gas blowing from the nozzle 9 coincide with the starting and the ending of the site 2a of the submerged-scar B, respectively.

Therefore, the shield gas S blown from the torch 8 forms a shield gas ambience G2 that covers the surface of the welding site 1a of the upper welding base metal 1 and intercepts the surface of the welding site 1a from the open air. The shield gas S blown from the nozzle 9 also covers the surface of the site 2a of the submerged-scar B, forms the shield gas ambience (inert gas ambience) G3 and intercepts the surface of site 2a of the submerged-scar B from the open air. Since the shield gas ambiences G2 and G3 respectively intercept the welding site 1a and the site 2a of the submerged-scar B from both oxygen and hydrogen in the air, the forming of the blow holes and the surface oxidation of the beads due to the enrollment as reaction with the hydrogen and oxygen included in the open air can be prevented.

By setting the movement speed of the above manipulator to which the nozzle 9 is installed to coincide with the movement speed of the torch 8 and to synchronize the torch 8 and the nozzle 9 in the movement from the starting point to the ending point and blowing the shield gases S from the nozzle 9 and the torch 8 at the same time as the irradiation of laser L, the keyhole is pushed up from the side of the submerged-scar B and the beads are quickly cooled by the shield gas S, the viscosity of the melted metal quickly increases and therefore the generation of projection T and the under-fill is suppressed. Accordingly, the submerged-scar B is formed in such a shape that the height of the extrusion is substantially constant along the weld line, the outer curve of the cross section of the extrusion against the downward is smooth and a sound welded joint that has strong bonding strength is obtained. It is also possible to reduce the quantity of the filler necessary to refill because the under-fill is suppressed in this welding process. In short, this second embodiment can solve the conventional technical problem as well as the first embodiment can.

EXAMPLES OF THE EMBODIMENTS

Some examples regarding to the present invention will be explained with referring to FIG. 3 to FIG. 7. In these examples, the welding processes have been carried out using A5052 (a nomenclature in JIS) aluminum plates for the welding base metals 1 and 2 for the upper site and the lower site for the through weld. A YAG laser has been used for forming the welded joint of the welding base metals 1 and 2.

Example 1

Figure 3:
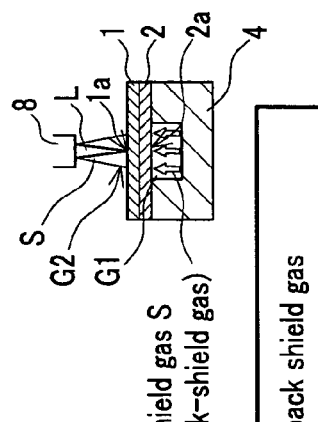
FIG. 3 shows plan views (upper schematics in the fields of columns) and side views (lower schematics in the fields of columns) of welded joints regarding to the through weld described in the first embodiment for the cases such that a back-shield gas is supplied and that no back-shield gas is supplied.

FIG. 3 shows the plan views (upper schematics in the fields of columns) and the side views (lower schematics in the fields of columns) of the welded joints regarding to the through weld described in the first embodiment for the cases such that the back-shield gas is supplied, in other words, the shield gas S is blown to the site 2a of the submerged-scar B and the ambience of the shield gas is made and no back-shield gas is supplied, in other words, no shield gas is blown thereto.

Changing the pairs of the thickness of welding base metals 1 and 2 and the welding speed under the same flow ratio of the shield gas S supplied to the side of the submerged-scar B and that supplied to the laser irradiation side kept constant, the heat input against the welding site 1a of the upper and the lower welding base metals 1 and 2 per unit time by the laser beam L is reversely proportional to the welding speed. The silver frost like projection T is formed on the surface of the submerged-scar when the welding speed is low (3 m/min.) under the condition of no shield gas supply and plurality of need-like projections T is formed when the back-shield gas is supplied when the welding speed is high (6 m/min.) However in the latter case, forming of the projection on the surface of the submerged-scar B is suppressed when the back-shield gas is supplied.

Example 2

Figure 4:
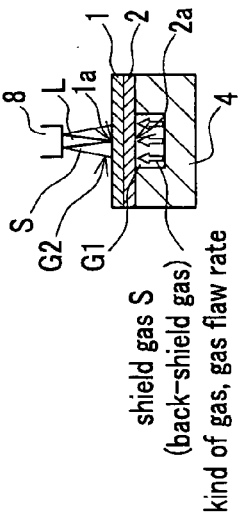
FIG. 4 shows a cross sectional view of welded joints regarding to the through weld described in the first embodiment for a case that a gas flow rate of a shield gas supplied onto a laser irradiation side is kept constant and a shield gas supplied onto a submerged-scar side is varied.

FIG. 4 shows a cross sectional view of the welded joint regarding to the through weld described in the first embodiment for a case that the gas flow rate of the shield gas supplied onto the laser irradiation side is kept constant and the shield gas S supplied onto the submerged-scar side is varied as 10 l/min., 25 l/min. and 40 l/min. FIG. 5 shows the plan views (upper schematics in the fields of columns) and the side views (lower schematics in the fields of columns) of the welded joint in the same conditions. In order to study the effect of the shield gases for the welded joints against the kind of gases, three inert gases as Ar (argon gas), N2 (nitrogen gas) and He (helium gas) have been used. For this case, the shield gases have been blown to the submerged-scar B in the upper direction beneath the submerged-scar B. For the purpose of comparison to a nominal condition, a through weld by using compressed air has been carried out.

As shown in FIG. 4, changing the flow rate of the shield gas supplied to the side of the submerged-scar as 10 l/min., 25 l/min. and 40 l/min., a welded joint that heaps up in a fan-shape in response to the increase of the flow rate of shield gas S has been made. From this result, it has been known that the shield gas pushes up the keyhole and the forming of the under-fill is suppressed by increasing the flow rate of the shield gas S that results in the increase of the pushed up volume of the keyhole. There are no remarkable differences in pushed up volume between the inert gases and the compressed air as used for the shield gases. The height of extrusion of the submerged-scar can be changed by controlling the flow rate of the compressed air however it has been found that the compressed air has no large effect in suppressing the forming of the projection T. Therefore, in order to prevent the forming of the projection T, it is important to push up the molten poor by the inert gases as covering the submerged-scar with the inert gases.

Therefore, it is also possible to reduce the quantity of the filler necessary to refill by adjusting the flow rate of the shield gases.

Example 3

Figure 6:
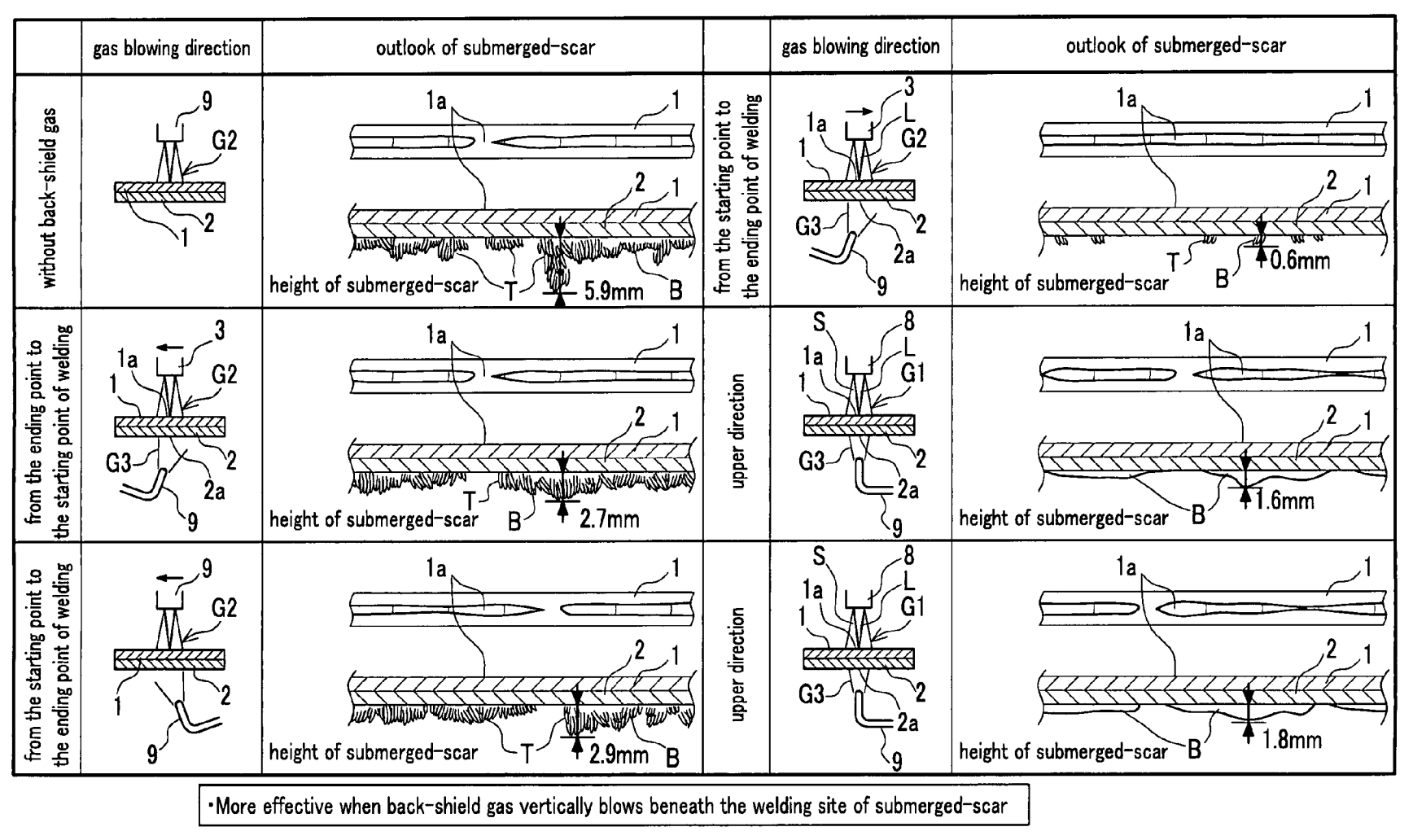

FIG. 6 shows a cross sectional view of the welded joint regarding to the through weld described in the second embodiment for the case when the blowing direction of the shield gas S is changed in accordance with the direction of the nozzle against the submerged-scar B.

As shown in FIG. 6, the projection T is formed on the submerged-scar when no back-shield gas is supplied however the shape of the formation of the projection T changes in accordance with the blowing direction of the shield gas supply against the submerged-scar B.

In more details to explain, setting the nozzle 9 obliquely upward direction toward the starting point from the ending point on the weld line or toward the ending point from the starting point, then the projections have been sometimes formed on the submerged-scar for the obliquely upward blowing of the shield gas. However, the forming of the projections has been prevented to be formed when the shield gas has been vertically blown beneath the submerged-scar along the weld line.

Therefore it is preferable to set the blowing direction of the shield gas in vertical direction and set the shield gas S to blow to the submerged-scar along the weld line.

Example 4

Figure 7:
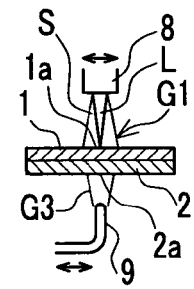
FIG. 7 shows a plan view (upper schematics in the fields of columns) , a side view (lower schematics in the fields of columns) and a cross sectional view of a welded joint regarding to the through weld described in the second embodiment for cases wherein the gap between the outlet of the nozzle and the submerged-scar site is changed.

FIG. 7 shows a plan view (upper schematics in the fields of columns), a side view (lower schematics in the fields of columns) and a cross sectional view of the welded joint regarding to the through weld described in the second embodiment for the cases wherein the gap between the outlet of the nozzle 9 and the submerged-scar site 2a is changed.

For this example, the gaps between the outlet of the nozzle 9 and the submerged-scar site 2a have been selected to be 3 mm, 10 mm, 15 mm and 20 mm. It has been found the projection T has been formed when the gaps set in 3 mm, 15 mm and 20 mm however the forming of the projection have been suppressed for the gap range for 6–10 mm. When the gap is more than 10 mm, it is thought the effect of the shield gas S is reduced (as insufficient flow rate of the shield gas) to suppress the forming of the projection T. On the other hand, when the gap is 3 mm, it can be concluded that the dynamic pressure of the shield gas against the submerged-scar site is too high to be stable or the shield gas flow convolves the beads however these phenomena can be thought to be removed by optimizing the blowing direction of the shield gas S and adjusting the flow rate of the shield gas S.

As explained in details above, it is obvious that the present invention enables to form no projections on the submerged-scar by the effects of pushing up the keyhole, cooling of the beads and covering over the weld site with inert gasses and to resultantly remove the rework as stripping off the projections after welding the welded joint. Moreover, the additional superior effect as sound forming welded joint that has no oxidation on the welded joint can be raised, other than suppressing the failures of welding such as the under-fill of the weld site and interruption of weld line.

What is claimed is:

1. A through weld method using applied to high energy beams, the method comprising the following steps:
    a positioning a first aluminum or aluminum alloy welding base metals opposite a source of the energy beams the first welding base metal having a first surface and a second surface opposite the first surface;
    a disposing step of disposing a second aluminum or aluminum alloy welding base metal beneath the first welding base metal, the second welding base metal having a first surface and a second surface opposite the first surface, wherein the second surface of the first welding base material directly abuts the first surface of the second welding base metal; and
    a supplying step of supplying a shield gas is form ambience over a submerged-scar projecting from a welding site defined on a second surface of the second welding base metal, as well as the shield gas to cool and push up a scar projection from the welding site on second surface of the second welding base metal, wherein a vertical height of a submerged scar is reduced.

2. The through weld method according to claim 1, wherein an inert gas is used for said shield gas.

3. The through weld method according to claim 2, wherein argon gas, nitrogen gas or helium gas is used for said inert gas.

4. The through weld method according to claim 1, further comprising:
    a fixing the first and second welding base metals onto a mounting stage wherein the mounting stage comprises:
        a chamber constructed therein,
        an open hole that opens at an upper side of the mounting stage which opens to the submerged-scar and leads the shield gas supplied to the chamber, and
        a shield gas supply that provides said shield gas ambience to the chamber.

5. The through weld method according to claim 1, further comprising:
    a fixing step of fixing the first and second welding base metals onto a mounting stage; and
    a using step of using a shield gas supply to provide the ambience shield gas, the shield gas supply including a manipulator a to move and position the shield gas supply nozzle beneath and opposite to the submerged-scar.

6. The through weld method according to claim 1, wherein the shield gas supply nozzle is arranged to supply the shield gas in a direction that is orthogonal relative to the second surface of the welding base metal.

7. The through weld method according to claim 6, wherein the shield gas supply nozzle moves beneath the welding metals in accordance to advancing the welding beam of the through weld thereon.

8. The through weld method according to claim 1, wherein the shield gas supply nozzle is arranged to supply the shield gas in a direction that is oblique relative to the second surface of the second welding base metal.

* * * * *